Figure 1:
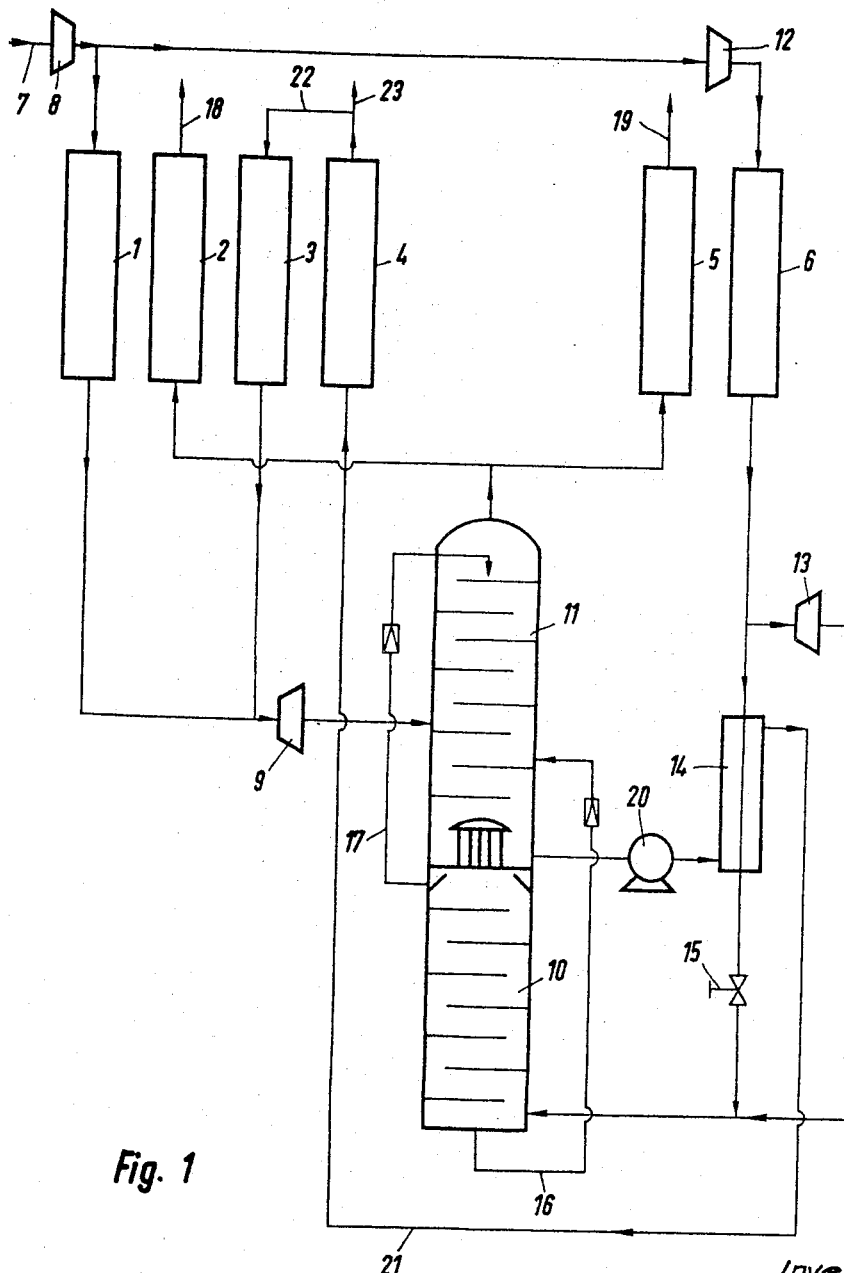

Inventor
RUDOLF BECKER
By Toulmin & Toulmin
Attorneys

Inventor
RUDOLF BECKER
By Toulmin & Toulmin
Attorneys

3,280,574
HIGH PRESSURE PURE GAS FOR PREVENTING CONTAMINATION BY LOW PRESSURE RAW GAS IN REVERSING REGENERATORS
Rudolf Becker, Munich-Solln, Germany, assignor to Linde Aktiengesellschaft
Filed Oct. 12, 1961, Ser. No. 144,776
Claims priority, application Germany, Oct. 14, 1960, G 30,703
8 Claims. (Cl. 62—13)

The present invention relates to the production of gases having a high purity, more particularly, to a process and apparatus for obtaining particularly pure gases or gas separation products in low temperature purification or separation installations, respectively, wherein the heat exchange between the incoming crude gas and the pure gas occurs in reversible heat exchangers such as regenerators.

Pure separation products have been obtained from the separation of liquid air by passing the pure gases and the air to be separated in heat exchange relationship in tubular heat exchangers or in regenerators within which spiral coils of tubes are mounted. In order to obtain good heat exchange characteristics it is necessary that large areas of heating surface be provided.

The aforementioned heat exchange has also been carried out in normal regenerators wherein complicated switching arrangements and some provision for an intermediate ventilation are required in order to prevent a leakage of the incoming air into the pure separation products.

It is apparent that in the production of gas separation products of a high purity it is necessary to prevent even small quantities of crude gas to mix with the gas separation products during the heat exchange. Any mixing of the crude incoming gas and the pure gas produced by the separation process will, of course, decrease the purity of the final gas product.

It is therefore the principal object of the present invention to provide a novel and improved method and apparatus for the production of gases of a high purity in both low temperature purification and separation installations.

It is a further object of the present invention to provide a process and an apparatus for passing crude incoming gas in heat exchange relationship with pure gas products produced in a low temperature purification or separation installation in such a manner that the purity of the final gas products is high.

The present invention essentially comprises maintaining that portion of the crude gas which is to be brought into heat exchange relationship with the pure gas at a lower pressure than that of the pure gas while these gases are passing through the reversible heat exchanger. This procedure ensures that, in the event of any leakage in the valves, the pure gas will leak into the crude gas and hence the purity of the pure gas will not be lowered by any leakage of the crude gas therein.

The present invention can be carried out in several different embodiments. Gaseous separation products removed from the rectification column can be compressed while cold to a higher pressure than that of the incoming crude gas and then pass through the regenerators to be heated therein. Liquid separation products tapped from the rectification column can first be compressed to a higher pressure, evaporated and then heated to the ambient temperature in the regenerators used for cooling the incoming crude gas.

In either event it is desirable to cleanse the regenerators from deposits of impurities accumulating therein as well as from the incoming crude gas which remains in the hollow spaces of the regenerator. This is preferably done by utilizing a predetermined scavenging cycle. This scavenging can be carried out by conventional processes such as by utilizing a portion of the gas separation products for scavenging and then mixing this portion of gases with the incoming crude gases. The scavenging may also be conducted by passing gases through the regenerators at an increased pressure or by exhausting the regenerators by applying a vacuum thereto.

In one embodiment of the invention the incoming crude gas is flowed into the low temperature separation installation in two streams which are at different pressures. The pure gas separation product which is produced from the higher pressure stream of crude gas is passed through the regenerators through which the stream of crude gas under the lower pressure was admitted into the installation. In this embodiment the regenerators may be cleansed by a predetermined scavenging cycle before the pure separation product passes therethrough.

In the event little or no refrigerating effect is produced in the installation itself, losses in refrigeration can be compensated for by a particular circulation of liquefied gases.

According to another embodiment of the present invention a pure separation product obtained under the higher pressure can be circulated through a special refrigerating system which also comprises regenerators. The pure separation product under pressure that has been heated to the ambient temperature is again cooled down in a regenerator. One portion of the cooled product is expanded to a pressure somewhat higher than the atmospheric pressure and simultaneously used for performing work. The heat of this expanded product is exchanged with the other portion of the separation product. This other portion of the separation product is liquefied and then recirculated into the separation apparatus. The expanded gas which has been heated during the heat exchange is heated in a further regenerator to the ambient temperature and then drawn from the installation.

When the invention is applied to the production of nitrogen of a high purity and the nitrogen is conducted under pressure to a rectification column to be used for washing, the losses in refrigerative effect can be compensated for by the addition of liquid gases which are tapped from the nitrogen washing installation.

Figure 2:
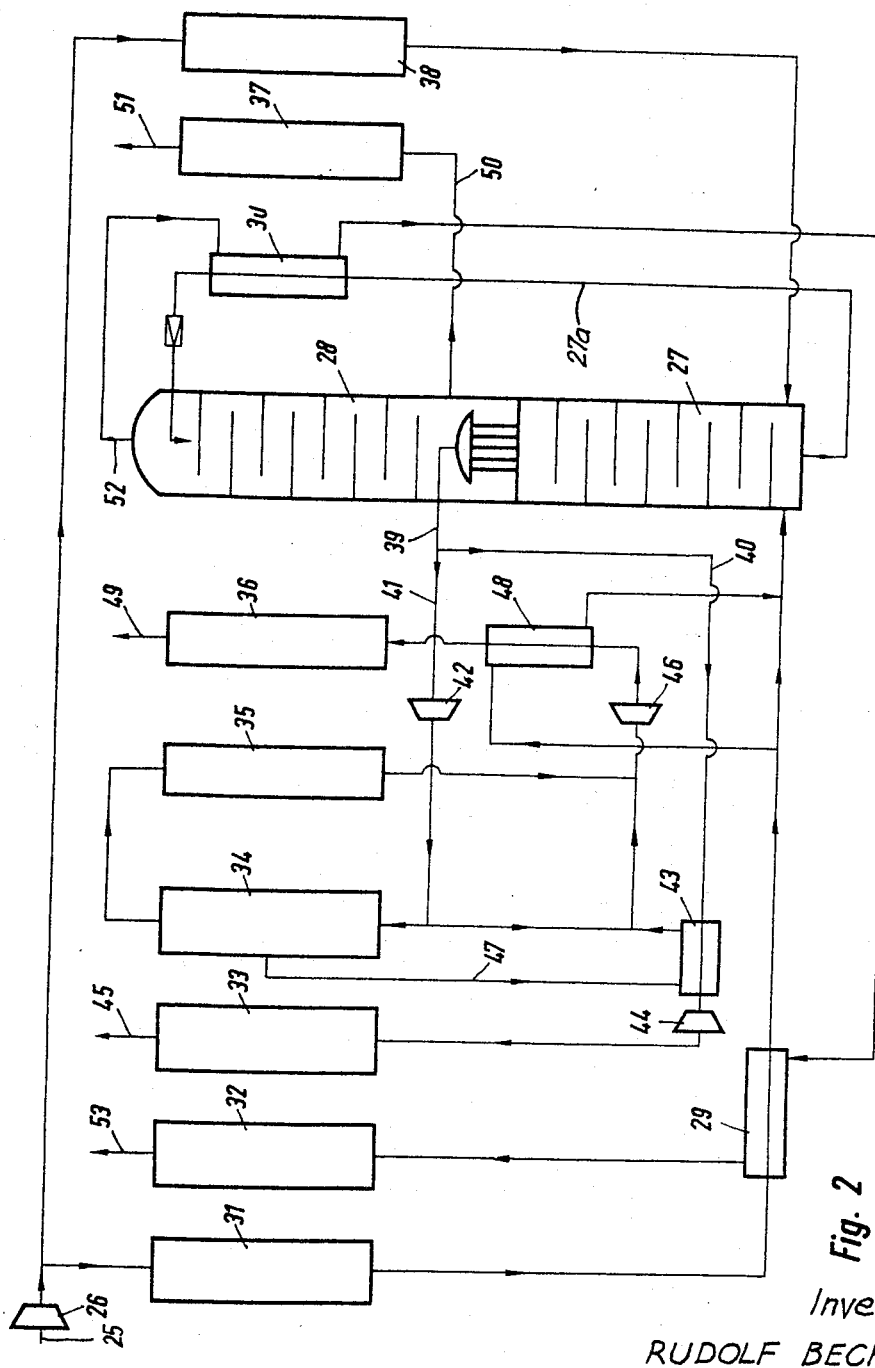
Figure 3:
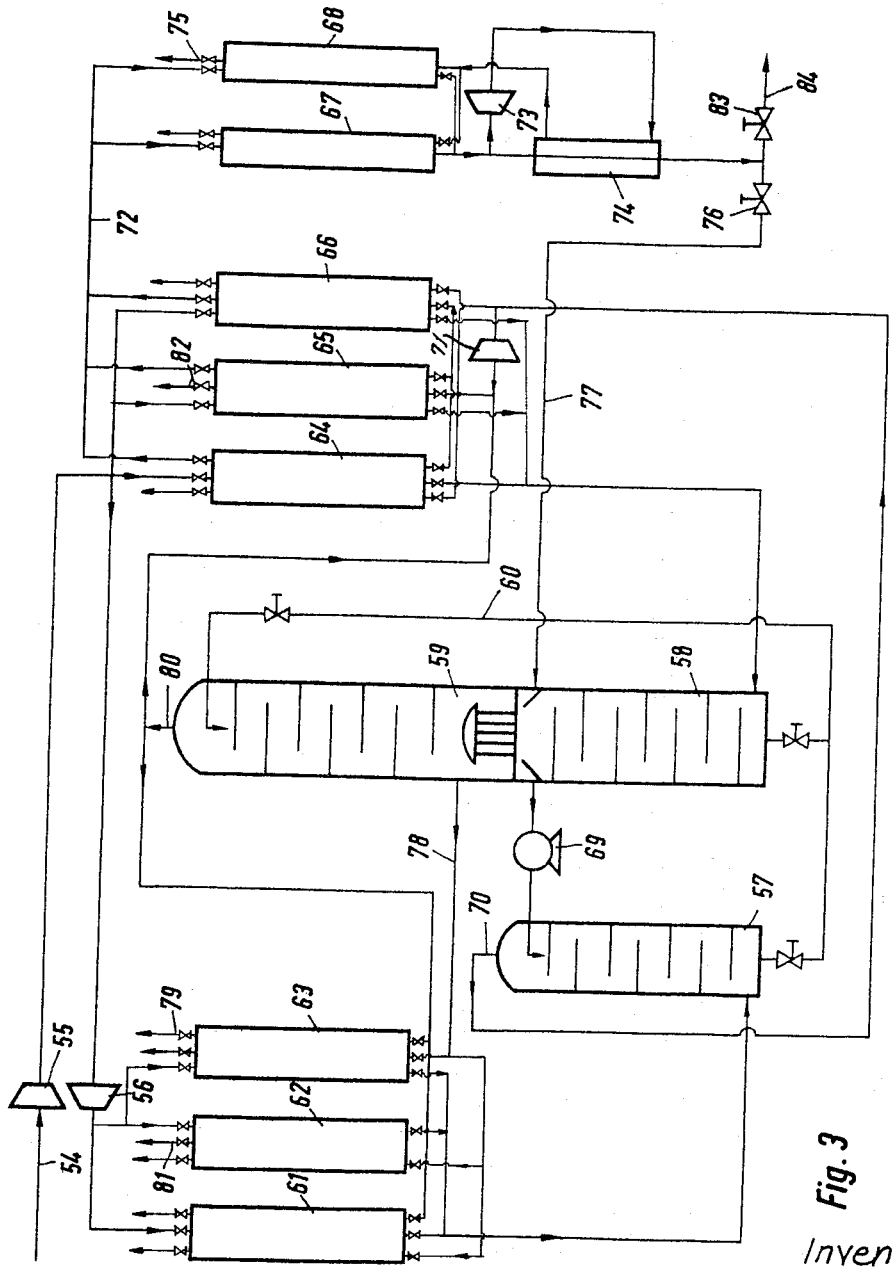

Other objects and advantages of the present invention will be apparent upon reference to the accompanying description when taken in conjunction with the following drawings, wherein FIGURE 1 is a schematic diagram of an installation for producing particularly pure oxygen;

FIGURE 2 is a schematic drawing of an installation for producing particularly pure nitrogen and oxygen; and FIGURE 3 is a schematic drawing of an installation for producing particularly pure nitrogen.

The installations of the present invention are presented schematically in order to clarify the illustration and description of the invention and to facilitate the comprehension thereof. In order to further simplify the drawings, the switching elements of the regenerators have been omitted. The functions of the switching elements are reversed according to predetermined cycles. The arrows in the flowlines indicate the direction of flow within certain switching phases which will be described in detail in the description of the invention.

Proceeding next to FIGURE 1 there are shown regenerators 1, 2, 3 and 4 whose functions can be interchanged among themselves according to a predetermined cycle. In addition, reversible regenerators 5 and 6 are also provided. In order to produce pure oxygen in the installation of FIGURE 1, 50,000 Nm.³/h. of air are introduced through the supply conduit 7 and immediately passed into a compressor 8. In this compressor the air is compressed to a pressure of 2 atmospheres.

20,000 Nm.³/h. of the compressed air is then tapped from the outlet of the compressor 8 and cooled and purified in the regenerator 1. The cooled air is then expanded in a turbine 9 and is flowed into a low pressure stage 11 of a two-stage rectification column comprising a high pressure stage 10 and a low pressure stage 11.

The remaining 30,000 Nm.³/h. of air discharged from the compressor 8 are further compressed in a compressor 12 to a pressure of seven atmospheres. This air is then passed through regenerator 6 where it is cooled and purified. A portion of this cooled air is then passed into a turbine 13 wherein it is expanded to a pressure of 5.6 atmospheres, and simultaneously performs work. The other portion of the air emerging from the regenerator 6 is passed through a heat exchanger 14 wherein it is liquefied and then throttled in a valve 15 to a pressure of 5.6 atmospheres. Both portions of the air emerging from the heat exchanger 14 and the turbine 13 are then joined and flowed into the high pressure column 10 of the two-stage rectification column.

A sump liquid enriched with oxygen is then tapped from the stage 10 through the line 16, throttled to a pressure of about 1.1 atmospheres and then introduced into the low pressure column 11.

Liquid nitrogen is tapped from the head of the high pressure column 10 through a line 17 and expanded as washing liquid into the head of the low pressure stage 11. Pure liquid oxygen is tapped from the sump of low pressure stage 11 and compressed to a pressure of 2.4 atmospheres by a pump 20. The compressed oxygen is then evaporated in the heat exchanger 14 and conducted through a line 21 into the regenerator 4, in which it is heated to the ambient temperature.

Part of this pure oxygen flowing out of the regenerator 4 is tapped off through a conduit 22 and passed through regenerator 3 in order to scavenge the same. The oxygen flowing out of the regenerator 3 after scavenging is then mixed with the incoming air is front of the turbine 9.

7,000 Nm.₃/h. of gaseous oxygen having a purity of 99.7% are tapped from the installation through conduit 23. The gaseous nitrogen removed from the head of low pressure stage 11 is heated in regenerators 2 and 5. Approximately 13,000 Nm.³/h. of nitrogen are discharged from the installation through conduit 18 and about 30,000 Nm.³/h. of nitrogen through conduit 19.

It is possible to remove liquid oxygen from the above-described installation by varying the pressures and quantities therein. In order to prdouce, for example, 800 Nm.³/h. of liquid oxygen and 6,200 Nm.³/h. of gaseous oxygen at a pressure of 3.7 atmospheres, 44,000 Nm.³/h. of air are compressed to 3.5 atmospheres in compressor 8 of which quantity 12,000 Nm.³/h. are admitted into regenerator 1 and 32,000 Nm.³/h. are further compressed to 10 atmospheres in compressor 12 prior to being admitted into regenerator 6.

Proceeding next to FIGURE 2 there is illustrated schematically an installation for obtaining nitrogen and oxygen having a purity of 98%. In this installation the regenerators 31, 32, 33 and 34 as well as the regenerators 35, 36, 37 and 38 belong to groups within which their functions can be interchanged according to a predetermined cycle. The air which is to be separated is introduced through conduit 25 and immediately supplied to a compressor 26 within which it is compressed to a pressure of 5.7 atmospheres. A portion of the compressed air is then passed through regenerator 31 within which it is cooled and purified and the other portion of the compressed air is flowed into regenerator 38. The portion of the air cooled in regenerator 31 is then liquefied in heat exchanger 29. This liquefied air and the air cooled in regenerator 38 are both supplied into the lower portion of the high pressure stage 27 of a two-stage rectification column. Liquid rich in oxygen is drawn off from the sump of the high pressure stage 27 through line 27a and is subcooled in heat exchanger 30, and then expanded in the low pressure stage 28.

Pure gaseous nitrogen is tapped from the head of the high pressure stage 27 through a conduit 39 and then divided into two conduits 40 and 41. The nitrogen passing through conduit 40 is heated in a heat exchanger 43, expanded to about 1.2 atmospheres in a turbine 44 and then heated in regenerator 33 wherein the nitrogen absorbs the impurities previously deposited in the regenerator. The nitrogen then discharges the impurities from the installation through a conduit 45. The nitrogen flowing through conduit 41 is compressed to a pressure of about 5.9 atmospheres in a compressor 42 and then divided into a stream which is passed through regenerator 34 in which the nitrogen is heated and into a second stream which is supplied to a turbine 46.

A part of the nitrogen flowing into the regenerator 34 is tapped at an intermediate point therefrom through conduit 47, cooled in the heat exchanger 43 and then also supplied to the turbine 46. The other portion of the nitrogen passes through regenerator 34 wherein it is heated to the ambient temperature and is then passed through the regenerator 35 wherein it is again cooled down and thereafter mixed with the pure nitrogen supplied to the turbine 46. In the turbine 46 all of the pure nitrogen is expanded to 2.7 atmospheres and then heated in a heat exchanger 48. The heated nitrogen then is flowed through the regenerator 36 and leaves the installation through a conduit 49 at a pressure of about 2.5 atmospheres.

Gaseous oxygen having a purity of 98% is tapped from the bottom of the low pressure column 28 through a conduit 50 within which it is flowed to regenerator 37 and subsequently discharged from the installation through conduit 51.

Gaseous impure nitrogen is discharged from the head of the low pressure column 28 through a conduit 52 and subsequently heated in heat exchangers 30 and 29 as well as in regenerator 32 and leaves the installation through conduit 53.

The installation schematically illustrated in FIGURE 3 is particularly adapted for obtaining pure nitrogen. The installation comprises a group of regenerators 61, 62 and 63, a second group of regenerators 64, 65 and 66 and a third group of regenerators 67 and 68. The functions of these regenerators are cyclically interchanged among themselves.

In the process utilizing the installation of FIGURE 3, 50,000 Nm.³/h. of air is supplied to the installation through supply conduit 54 and is immediately compressed to a pressure of 5.7 atmospheres in compressor 55. The compressed air discharged from the compressor 55 is then divided into two streams of air with one stream of air comprising 23,000 Nm.³/h. being further compressed to a pressure of 6.5 atmospheres in compressor 56. This air is then subsequently cooled and purified in regenerator 61 and then introduced into a single-stage rectification column 57.

The other stream of air comprising 27,000 Nm.³/h. is cooled in regenerator 64 and introduced into the high pressure stage 58 of a two-stage rectification apparatus comprising stages 58 and 59.

Liquids rich in oxygen are obtained through rectification in the columns 57 and 58 and collected in the sumps of these columns and then drained off through conduit 60 and expanded to a pressure of about 1.2 atmospheres. The expanded liquids are then supplied into the head of the low pressure stage 59.

Liquid nitrogen is tapped from the head of the high pressure stage 58, compressed to a pressure of about 6.3 atmospheres by pump 69 and then introduced as a washing liquid into the head of column 57. Pure gaseous nitrogen is tapped from the head of column 57 through conduit 70 and then divided. One part of this nitrogen is expanded in turbine 71 and used for scavenging regenerator 65 so as to cleanse any air remaining there after the previous cycle. The remaining part of the pure nitrogen comprising about 20,000 Nm.$^3$/h. is heated to the ambient temperature in regenerator 66. This pure nitrogen can then either be tapped from the installation through conduit 72 or, as shown in FIGURE 3, can be circulated through a refrigeration system for producing cold.

The refrigeration system operates in the following manner. Pure nitrogen supplied to the conduit 72 is cooled in regenerator 67 and then divided into two streams with one of the streams being expanded in turbine 73 while simultaneously performing work. This expanded stream subsequently liquefies the other divided stream which is flowed directly into heat exchanger 74. The first divided stream is then discharged from the heat exchanger 74 within which it is heated and then further heated to the ambient temperature in regenerator 68 and discharged from the installation through conduit 75. The portion of the pure nitrogen that was liquefied in heat exchanger 74 is expanded in valve 76 and introduced into the head of high pressure stage 58 through the conduit 77. Part of the liquefied nitrogen can then be tapped from the installation through valve 83 and conduit 84.

7,000 Nm.$^3$/h. of oxygen are tapped from the bottom of the low pressure stage 59 through conduit 78, are heated to the ambient temperature in regenerator 63 and then drawn off from the installation through conduit 79.

Gaseous impure nitrogen is discharged from the head of low pressure stage 59 through conduit 80 and is used for cooling and scavenging regenerators 62 and 65. Subsequently, this impure nitrogen is tapped from the installation through conduits 81 and 82.

The installations as illustrated in the drawings and described above are not limited to only producing the respectively described pure products but each of the illustrated installations can be used to produce each separation product or two separation products respectively in their pure state in a corresponding way.

It will be understood that this invention is susceptible to modification in order to adapt it to different usages and conditions and, accordingly, it is desired to comprehend such modifications within this invention as may fall within the scope of the appended claims.

What is claimed as this invention is:

1. A process for producing nitrogen of a high purity in a low temperature air separation installation comprising a two stage and a one stage rectification column wherein reversible heat exchangers are used for the heat exchange between said nitrogen and incoming air, and comprising the steps of maintaining the pressure of said one stage rectification column higher than a high pressure column of said two stage rectification column, pumping liquid nitrogen produced in said high pressure column of said two stage rectification column into the head of said one stage rectification column, expanding the sump liquid nitrogen produced in said one stage rectification column and said high pressure column of said two stage rectification column and introducing these sump liquids into said head of said low pressure column of said two stage rectification column, and passing at least a portion of said nitrogen produced in said one stage rectification column in heat exchange relationship with said incoming air at a pressure greater than the pressure of said incoming air.

2. A process for producing gases of a high purity by low temperature separation wherein reversible regenerators are used for the heat exchange between incoming crude gas and pure gas, and comprising the steps of passing at least a portion of said incoming crude gas in heat exchange relationship in one of said reversible regenerators with at least a portion of said pure gas and at a pressure less than the pressure of said pure gas, dividing said pure gas into a first stream and a second stream, expanding said first stream of pure gas while performing work, passing said first stream in heat exchange relationship with said other second stream so as to liquefy said second stream, passing said first stream through another of said reversible regenerators wherein the gas is again heated to the ambient temperature, and circulating at least a portion of said second stream through a pressure column of a low temperature separation installation.

3. A process for producing a pure gas from a crude gas in low temperature purification or separation installations, the improvement comprising; the use of reversible regenerators for heat exchange having a first cycle wherein the walls of said regenerators are cooled by direct contact with at least a portion of said pure gas at a given pressure, and a second cycle wherein at least a portion of said crude gas is cooled by direct contact with said walls at a pressure less than said given pressure of said pure gas.

4. A process for producing a cooled pure gas from a crude gas by low temperature separation, the improvement comprising; withdrawing at least a portion of said cooled pure gas and using reversible regenerators for heat exchange having a first cycle wherein the walls of said regenerators are cooled by direct contact with said portion of said cooled pure gas at a given pressure, and a second cycle wherein at least a portion of said crude gas is cooled by direct contact with said walls at a pressure less than said given pressure of said cooled pure gas.

5. A process for producing a cooled pure gas from a crude gas by low temperature separation wherein a portion of said cooled pure gas is a liquid, the improvement comprising; compressing said liquid, evaporating said liquid to a given gas pressure and using reversible regenerators for heat exchange having a first cycle wherein the walls of said regenerators are cooled by direct contact with said evaporated liquid, and a second cycle wherein at least a portion of said crude gas is cooled by direct contact with said walls at a pressure less than said given gas pressure.

6. A process for producing a cooled pure gas from a crude gas by low temperature separation, the improvement comprising; introducing said crude gas in a first stream having a given pressure and a second stream having a pressure less than said first stream, separating at least a portion of said cooled pure gas from said first stream and using reversible regenerators for heat exchange, having a first cycle wherein the walls of said regenerators are cooled by direct contact with said separated portion from said first stream, and a second cycle wherein said second stream is cooled by direct contact with said walls at a pressure less than that of said first cycle.

7. A process for producing a cooled pure gas from a crude gas by low temperature separation, the improvement comprising; introducing said crude gas in a first stream having a given pressure and a second stream having a pressure less than said first stream, separating at least a portion of said cooled pure gas from said first stream and using reversible regenerators for heat exchange, having a first cycle wherein the walls of said regenerators are cooled by direct contact with said separated portion from said first stream, a second cycle wherein said second stream is cooled by direct contact with said walls, and a third cycle wherein another portion of said cooled pure gas is expanded and passed through said regenerators to remove said second stream.

8. A process for producing a cooled pure gas from a crude gas by low temperature separation, the improvement comprising; introducing said crude gas in a first stream having a given pressure and a second stream having a pressure less than said first stream, separating at least a portion of said cooled pure gas from said first stream and using reversible regenerators for heat exchange, having a first cycle wherein the walls of said regenerators are cooled by direct contact with said separated portion from said first stream, a second cycle wherein said second stream is cooled by direct contact with said walls, and a third cycle wherein another portion of said cooled pure gas is expanded and passed through said regenerators to remove said second stream, and circulating said separated portion which was warmed in said first cycle through a refrigeration system for producing cold.

References Cited by the Examiner

UNITED STATES PATENTS

| | | | |
|---|---|---|---|
| 1,604,249 | 10/1926 | Van Nuys | 62—39 |
| 1,607,321 | 11/1926 | Van Nuys | 62—25 |
| 1,976,388 | 10/1934 | Eichelman | 62—41 |
| 2,239,883 | 4/1941 | De Baufre | 62—39 |
| 2,648,205 | 8/1953 | Hufnagel | 62—13 |
| 2,653,455 | 9/1953 | Etienne | 62—13 |
| 2,709,348 | 5/1955 | Yendall | 62—14 |
| 2,711,085 | 6/1955 | Anderson | 62—41 |
| 2,873,583 | 2/1959 | Potts | 62—41 |
| 2,918,802 | 12/1959 | Grunberg | 62—25 |

FOREIGN PATENTS

| | | |
|---|---|---|
| 752,439 | 1/1953 | Germany. |
| 880,893 | 6/1953 | Germany. |

NORMAN YUDKOFF, *Primary Examiner.*

ROBERT A. O'LEARY, R. C. STEINMETZ,
*Examiners.*